(12) United States Patent
Soohoo

(10) Patent No.: US 9,286,510 B2
(45) Date of Patent: Mar. 15, 2016

(54) SYSTEMS AND METHODS FOR REDEEMING USER ACTIVITY LEVEL FOR VIRTUAL CURRENCY

(71) Applicant: 473 Technology, Inc., Redwood Shores, CA (US)

(72) Inventor: Kenneth Soohoo, Redwood Shores, CA (US)

(73) Assignee: 473 TECHNOLOGY, INC., Redwood Shores, CA (US)

( * ) Notice: Subject to any disclaimer, the term of this patent is extended or adjusted under 35 U.S.C. 154(b) by 0 days.

(21) Appl. No.: 14/210,205

(22) Filed: Mar. 13, 2014

(65) Prior Publication Data

US 2014/0343700 A1 Nov. 20, 2014

Related U.S. Application Data

(60) Provisional application No. 61/799,704, filed on Mar. 15, 2013.

(51) Int. Cl.
    A63F 9/24      (2006.01)
    G06K 9/00      (2006.01)
    G06Q 30/02     (2012.01)

(52) U.S. Cl.
    CPC ........ G06K 9/00342 (2013.01); G06Q 30/0207 (2013.01)

(58) Field of Classification Search
    CPC .......................... A63F 13/12; A63F 2300/1025
    USPC .......................................................... 463/42
    See application file for complete search history.

(56) References Cited

U.S. PATENT DOCUMENTS

| | | | |
|---|---|---|---|
| 6,967,596 B2* | 11/2005 | Nguyen | 341/20 |
| 2007/0072156 A1 | 3/2007 | Kaufman et al. | |
| 2011/0191158 A1 | 8/2011 | Kateraas et al. | |
| 2012/0215328 A1 | 8/2012 | Schmelzer | |
| 2012/0258802 A1 | 10/2012 | Weston et al. | |
| 2013/0004923 A1 | 1/2013 | Utter, II | |

OTHER PUBLICATIONS

473 Technology Inc., International Search Report and Written Opinion, PCTUS2014/028875, Aug. 21, 2014, 7 pgs.
473 Technology Inc., International Preliminary Report on Patentability, PCT/US14/28875, Jan. 23, 2015, 11 pgs.

* cited by examiner

*Primary Examiner* — Omkar Deodhar
(74) *Attorney, Agent, or Firm* — Morgan, Lewis & Bockius LLP

(57) ABSTRACT

Systems, electronic devices, and methods for redeeming user activity level or other desired user behaviors for virtual currency are disclosed. In some implementations, a method includes: at a computer system, obtaining user activity information indicating an activity level of a user; and computing an in-application credit based on the activity level. The in-application credit can be redeemed by the user in an associated application. The in-application credit can be redeemed by the user for a coupon that can be applied towards out-of-application purchases. In some implementations, the activity level is determined in accordance with (i) a motion parameter reported by an activity sensor of an electronic device associated with the user, (ii) information obtained from a cell phone tower or a GPS device (e.g., using cell tower triangulation techniques); and (iii) self-reported user activity information. In some implementations, the method also includes converting the in-application credit for out-of-application purchases.

17 Claims, 7 Drawing Sheets

SYSTEMS AND METHODS FOR REDEEMING USER ACTIVITY LEVEL FOR VIRTUAL CURRENCY

RELATED APPLICATIONS

This application claims priority to U.S. Provisional Patent Application Ser. No. 61/799,704, filed on Mar. 15, 2013, entitled "System and Methods for Redeeming User Activity Level for Virtual Currency," which is hereby incorporated by reference in its entirety.

TECHNICAL FIELD

The disclosed implementations relate generally to redeeming user activity level or other desired user behaviors for virtual currency.

BACKGROUND

Some end user applications, e.g., game applications that run on smart phones or gaming devices, include mechanisms by which a user can purchase (with real currency) additional capabilities or tools to use in the game. Because these mechanisms rely on straight-forward in-game purchases and are not coupled to any external user behavior, such mechanisms are not suited to motivate users of the corresponding applications to adopt a particular external behavior. Conversely, there are fitness-oriented end user applications that keep track of certain user activities consistent with the application and provide scores or medals based on the user's perceived level of fitness as monitored by the application. Such in-application scores and medals are typically not perceived as having real value and therefore are not likely to encourage long-term desired user activity and, in turn, use of the application. As a result of the users' eventual loss of motivation, the application developer will not be able to retain a large user base for the application and the profitability, including profitability from the sales of related products. The above identified difficulties are reduced or eliminated by the systems and methods disclosed herein.

SUMMARY

Systems, methods, electronic devices, and non-transitory computer readable storage mediums for redeeming user activity level for virtual currency are disclosed herein.

In one aspect, a method includes: at a computer system, obtaining user activity information indicating an activity level of a user; and computing an in-application credit based on the user activity level. The in-application credit can be redeemed by the user in an associated application.

In some implementations, the user activity level is determined in accordance with a motion parameter reported by an activity sensor of an electronic device associated with the user.

In some implementations, the user activity level is determined in accordance with information obtained from a computing device other than the electronic device.

In some implementations, the user activity level is determined in accordance with information obtained from a cell phone tower or a GPS device.

In some implementations, the user activity level is also determined in accordance with self-reported user activity information.

In some implementations, the user activity level is further determined in accordance with one or more predefined conversion criteria on the self-reported user activity information.

In some implementations, the user activity information is obtained from two or more electronic devices associated with the user.

In some implementations, the in-application credit can be redeemed by the user for a credit that can be applied towards in-application purchases.

In some implementations, the in-application credit can be redeemed by the user for a coupon that can be applied towards out-of-application purchases.

In some implementations, the in-application credit can be redeemed for one of: a merchant credit, a discount voucher, a gift certificate, or a promotional credit.

In some implementations, the method further comprises: providing, to the user, one or more information items in accordance with the user activity level.

In some implementations, the one or more informational items include one of: promotional materials for sports equipments, exercise locations, activity providers; or dietary suggestions.

In some implementations, the method further comprises: converting a portion of the in-application credit for out-of-application purchases.

In some implementations, out-of-application purchases are made with one or more service or product providers.

In some implementations, the one or more service or product providers are selected based on one or more selection criteria.

In some implementations, the method further comprises: determining a type of user activity the user is or has involved in, in accordance with the motion parameter.

In some implementations, the in-application credit is computed in accordance with the type of user activity in accordance with the motion parameter.

In some implementations, the type of user activity is one of: a low carbon emission activity, a green energy activity, a low energy consumption activity, a health promotion activity, a low-risk activity, or a low-danger activity.

In some implementations, the motion parameter includes information indicating a manner of activity or movement the user is involved in.

In some implementations, the manner of the activity or the movement the user is involved in includes one of: (i) a type of activity or movement the user is involved in; (ii) a speed associated with the activity or the movement; (iii) an acceleration associated with the activity or the movement; (iv) a direction or orientation associated with the activity or the movement; or (v) a type of environment in which the activity or the movement takes place.

In some implementations, the associated application is configured for execution on the electronic device.

In some implementations, the user is represented by an avatar in the associated application, and at least one characteristic associated with the avatar corresponds to a historical activity level of the user.

In some implementations, the associated application is a gaming application.

In some implementations, the motion parameter includes information indicating a manner of the user's finger movement in relation to the electronic device.

In some implementations, the method also includes: reporting the in-application credit to a second computing device for book-keeping, sharing or synchronization.

In some implementations, a computer system, and a non-transitory computer readable storage medium storing one or more programs, which when executed by a computer, cause the computer to perform one or more steps of the above-described methods are also disclosed.

In a second aspect, a method includes: at an electronic device having an activity sensor, identifying a motion parameter reported by the activity sensor; computing activity level of a user associated with the electronic device, in accordance with the motion parameter; and computing an in-application credit based on the user activity level, wherein the in-application credit can be redeemed by the user in an associated application.

In some implementations, the method also includes: computing the user activity level in accordance with self-reported user activity information.

In some implementations, the method also includes: adjusting the self-reported user activity information in accordance with one or more conversation criteria to produce adjusted self-reported user activity information. The user activity level is computed in accordance with the adjusted self-reported user activity information.

In some implementations, the user activity information is obtained from two or more electronic devices associated with the user.

In some implementations, the in-application credit can be redeemed by the user for a credit that can be applied towards in-application purchases.

In some implementations, the in-application credit can be redeemed by the user for a coupon that can be applied towards out-of-application purchases.

In some implementations, the in-application credit can be redeemed for one of: a merchant credit, a discount voucher, a gift certificate, or a promotional credit.

In some implementations, the method also includes: providing, to the user, one or more information items in accordance with the user activity level.

In some implementations, the one or more informational items include one of: promotional materials for sports equipments, exercise locations, activity providers; or dietary suggestions.

In some implementations, the method also includes: converting a portion of the in-application credit for out-of-application purchases.

In some implementations, the out-of-application purchases are made with one or more service or product providers.

In some implementations, the one or more service or product providers are selected based on one or more selection criteria.

In some implementations, the method also includes: determining a type of user activity the user is or has involved in, in accordance with the motion parameter.

In some implementations, the in-application credit is computed in accordance with the type of user activity in accordance with the motion parameter.

In some implementations, the type of user activity is one of: a low carbon emission activity, a green energy activity, a low energy consumption activity, a health promotion activity, a low-risk activity, or a low-danger activity.

In some implementations, the motion parameter includes information indicating a manner of activity or movement the user is involved in.

In some implementations, the manner of the activity or the movement the user is involved in includes one of: (i) a type of activity or movement the user is involved in; (ii) a speed associated with the activity or the movement; (iii) an acceleration associated with the activity or the movement; (iv) a direction or orientation associated with the activity or the movement; or (v) a type of environment in which the activity or the movement takes place.

In some implementations, the associated application is configured for execution on the electronic device.

In some implementations, the user is represented by an avatar in the associated application, and at least one characteristic associated with the avatar corresponds to a historical activity level of the user.

In some implementations, the associated application is a gaming application.

In some implementations, the motion parameter includes information indicating a manner of the user's finger movement in relation to the electronic device.

In some implementations, the method also includes: reporting the in-application credit to a second computing device for book-keeping, sharing or synchronization.

In some implementations, an electronic device, and a non-transitory computer readable storage medium storing one or more programs, which when executed by a device, cause the device to perform one or more steps of the above-described methods are also disclose.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Figure 1:
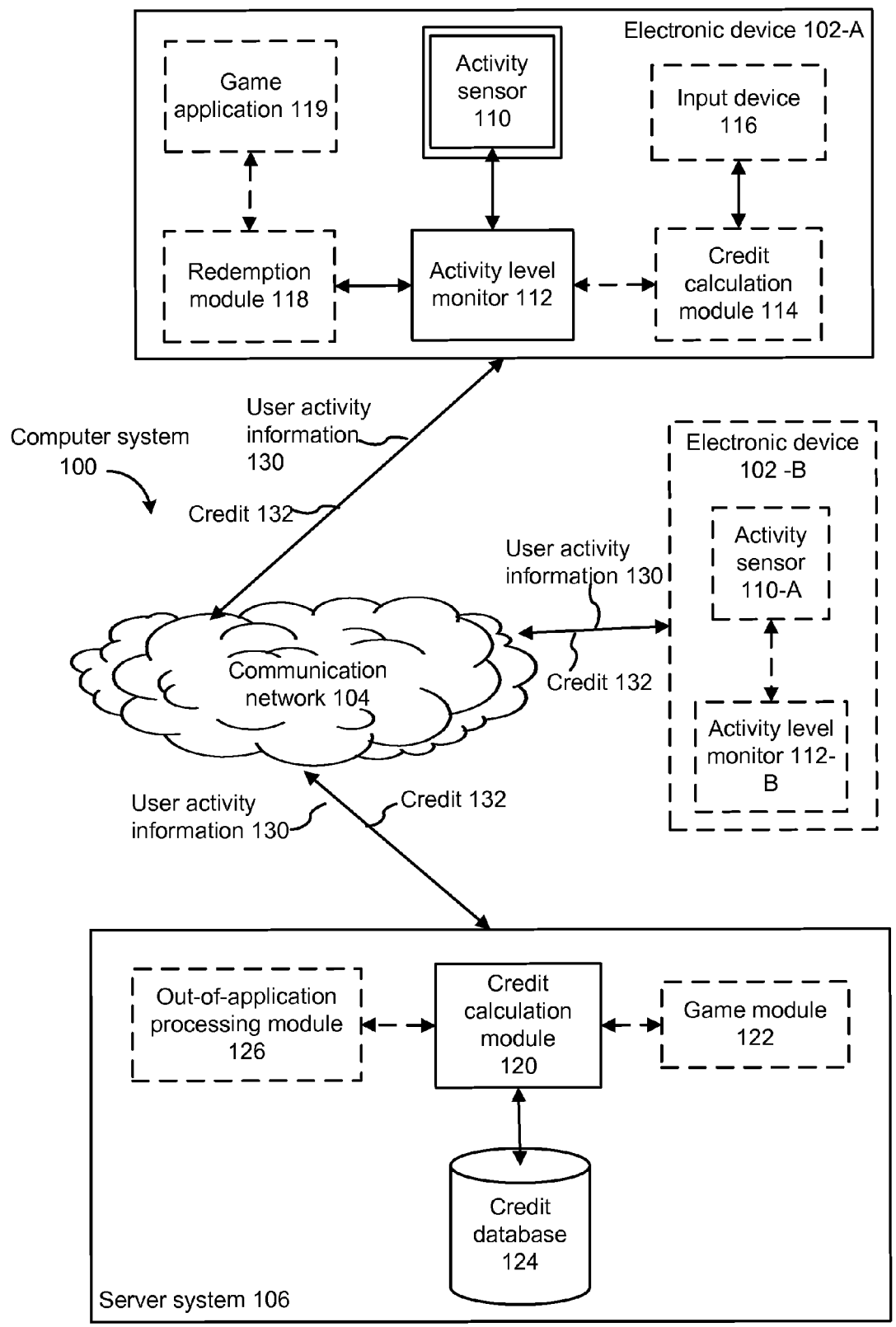
FIG. 1 is a block diagram illustrating a computer system, in accordance with some implementations.

The implementations described herein provide techniques for redeeming user activity level for virtual currency or credits, such as credits for use in a video game, or a coupon for a fitness class. These techniques can be employed to encourage healthy or other beneficial behaviors in users, such as daily exercise, reducing risky behaviors, or adopting energy efficient or environmentally-beneficial habits. From a content provider's perspective, these techniques can increase user retention (in terms of long term use of applications and promoted products) and enhance application "stickiness" and therefore boost the content providers' and/or developers' profitability.

The techniques described herein can be employed in conjunction with an electronic device, such as a personal fitness monitor (e.g., an activity sensing device worn on a wrist or a belt), that outputs user activity information to an application running on the electronic device or a server. Based on the user activity information, the application can award in-application currency/credits or out-of application currency/credits. The techniques described herein can be also employed in conjunction with different types of personal electronic devices that include one or more activity sensors, such as a smartphone with built-in accelerometers and/or GPS chips that output user activity information. The user activity information can be used in a variety of ways. For example, in some implementations, the user activity information is used by a game running on the smartphone to generate in-game currency/credits. In some implementations, the user activity information is used by a game running on the smartphone to generate coupons for out-of-game use. In some implementations, the user activity information is used by a server to generate in-game currency/credits for an online game. And, in some implementations, the user activity information is used by a server to generate coupons for out-of-game use.

In some implementations, the user activity level is determined through mechanisms other than an activity sensor included in the electronic device. For example, a user's activity can be determined through cell-tower or other radio signal triangulation, as performed by a server using signals provided by the electronic device and other environmental information.

The techniques described herein can be also employed in conjunction with a portable user interface (UI) device (e.g., a Wiimote device) that reports user activity information to a game console, which can generate corresponding in-game currency/credits.

In this way, a user is encouraged to be more active and to engage in certain health-promoting activities as the user's participation in the encouraged activities will be rewarded with credits that can be applied toward purchases of products or services the user desires. Also, in this way, a content provider gains additional opportunities to interact with a user and the stickiness profitability of their applications are enhanced.

Additional details of implementations are now described in relation to the Figures.

FIG. 1 is a block diagram illustrating a computer system 100 for redeeming user activity level for virtual currency, in accordance with some implementations. In some implementations, the computer system 100 includes one or more electronic devices 102 ("electronic devices 102"), a communication network 104, and a server system 106. In some implementations, the computer system 100 includes two or more electronic devices 102 (e.g., the electronic device 102-A, and the electronic device 102-B).

In some implementations, the electronic device 102 receives information concerning user activity 130 (e.g., whether a user is running or swimming), computes a user activity level in accordance therewith, and additionally computes credits 132 (e.g., an in-application credit) based on the activity level. In some implementations, the in-application credit can be redeemed for credits in a game application, as well as credits for out-of-game purchases (e.g., a gift card at a local fitness center).

In some implementations, the electronic device 102 includes one or more activity sensors 110, an activity level monitor 112, a credit calculation module 114, an input device 116, a redemption module 118, and a game application 119. In some implementations, the electronic device 102 includes, or is embedded in or attached to, a smartphone, a bracelet, a belt, a shoe insole, a pair of glasses or swimming goggles, a watch, a ring, a head band, or a piece of jewelry (e.g., a necklace or an earning).

In some implementations, the activity sensor 110 collects data concerning user activity or movement. For example, the activity sensor 110 is configured to determine whether a user mobile or still, moving forwards or backwards, the speed of a user movement, or the user's location. In some implementations, the activity sensor 110 includes one or more of a pedometer, an accelerometer, a tilt sensor, an altitude sensor, a pressure sensor, a compass, and a combination of one or more of these sensors.

In some implementations, the activity level monitor 112 collects data from the one more activity sensors, identifies a type of activity a user is engaged in (e g, running, jogging or hiking), and calculates an activity level for the user (e.g., how much calories a user has burned in the past hour).

In some implementations, the credit calculation module 114 calculates an amount of credit, in accordance with a user's activity level, e.g., 10 credits per every 1,000 calories burned. In some implementations, the input device 116 (e.g., a keyboard, a mouse, a touchpad, or a touchscreen) allows a user to self-report activity level, by entering them directly into the credit calculation module 114.

In some implementations, the redemption module 118 redeems credits a user has accrued in a game application (e.g., a video game or a computer game). In some implementations, the game application 119 includes a video game (e.g., a NINTENDO WII game) or a computer game (e.g., a HALF LIFE game).

In some implementations, two or more electronic devices 102 (or the activity level monitors included therein) communicate with each other. For example, in some implementations, the activity level monitor 112 transmits user activity information to the activity level monitor 112-B, where user activity information collected by both electronic devices 102-A and 102-B and adjusted (e.g., totaled, integrated, and averaged), and the adjusted (e.g., total) amount is sent to the server 106.

In some implementations, the communication network 104 optionally includes the Internet, one or more local area networks (LANs), one or more wide area networks (WANs), other types of networks, or a combination of such networks.

In some implementations, the server 106 includes a credit calculation module 114, a game module 122, a credit data base 124, and optionally an out-of-purchase processing module 126. In some implementations, the credit calculation module 114 computes credits for a particular user based on activity level information received from one or more electronic devices associated with the particular user. In some implementations, the credit calculation module 114 calculates an amount of credit, in accordance with a user's activity level, e.g., 10 credits per every 1,000 calories burned.

In some implementations, the game module 122 applies credits calculated into one or more games associated with a user, as well as maintaining gaming records for the user. In some implementations, the credit database 124 store, for one or more users, credits currently available, credits redemption history, reward history, out-of-application purchase history.

In some implementations, the out-of-application processing module 126 applies credits calculated for a user to out-of-game purchases (e.g., generating a coupon or a gift card for purchasing a STARBUCKS coffee at a local supermarket).

Figure 2:
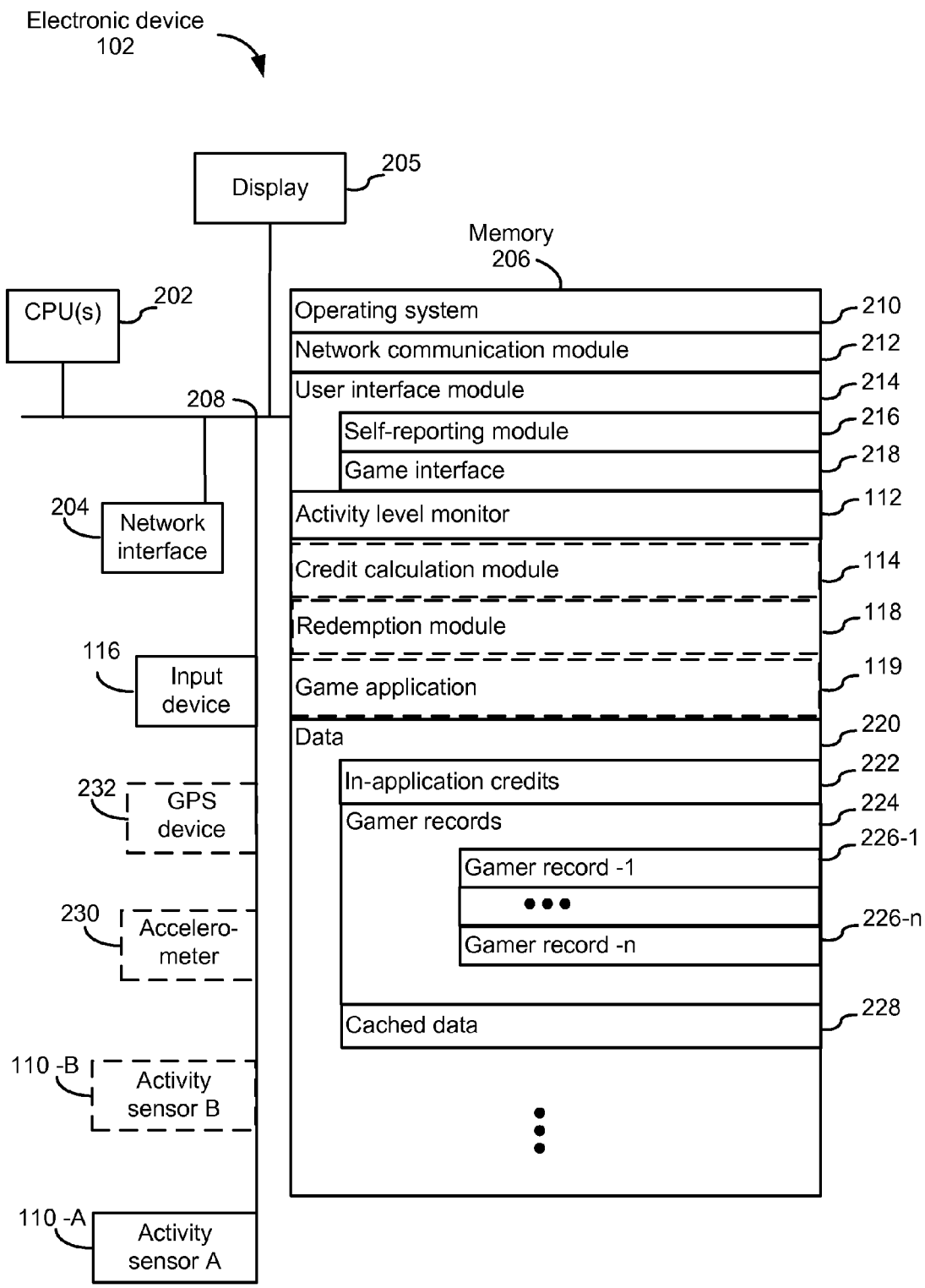
FIG. 2 is a block diagram illustrating an electronic device, in accordance with some implementations.

FIG. 2 is a block diagram illustrating an electronic device 102 ("electronic device 102") in accordance with some implementations. The electronic device 102, in some implementations, includes one or more processing units CPU(s) 202 (also herein referred to as processors), one or more network interfaces 204, memory 206, the input device 116 (e.g., a keyboard, a mouse, a touchpad, or a touchscreen), a display 118, one or more activity sensors 110-A and 110-B, an accelerometer 230, a GPS device, and one or more communication buses 208 for interconnecting these components. The communication buses 208 optionally include circuitry (sometimes called a chipset) that interconnects and controls communications between system components. The memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 201. The memory 206, or alternatively the non-volatile memory device(s) within the memory 206, comprises a non-transitory computer readable storage medium. In some implementations, the memory 206 or alternatively the non-transitory computer readable storage medium stores the following programs, modules and data structures, or a subset thereof:

- an operating system 210, which includes procedures for handling various basic system services and for performing hardware dependent tasks;
- a network communication module (or instructions) 212 for connecting the electronic device 102 with other devices (e.g., the server 106 or other electronic devices 102) via one or more network interfaces 204 (wired or wireless), or the communication network 104 (FIG. 1);
- a user interface module 214 for displaying user interface components or controls (e.g., textboxes, buttons, radio buttons, drop-down lists) to a user, which includes:
  - a self-reporting module 216 for obtaining self-reported user activity level, from a user; and
  - a game interface 218 for interacting a user in a game application;
- an activity level monitor 112 for collecting data from the one or more activity sensors, for identifying a type of activity a user is engaged in (e g, running, jogging or hiking), and for calculating an activity level for the user;
- a credit calculation module 114 for calculating an amount of credit, in accordance with a user's activity level;
- a redemption module 118 for redeeming credits a user has accrued in one or more (e.g., game) applications; and
- data 220 stored on the electronic device 102, which include:
  - in-application credits 114 which represents an amount of credit a user has in an application; and
  - one or more game records 224 (e.g., 226-1 . . . 26-n) which represent records for one or more gamers or players; and
  - cached data 228 which represents data (e.g., user activity level, game records, or user activity history) collected from a sensor but have not been uploaded to a server.

In some implementations, the display 118 includes a touch-screen or a computer monitor.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above.

Figure 3:
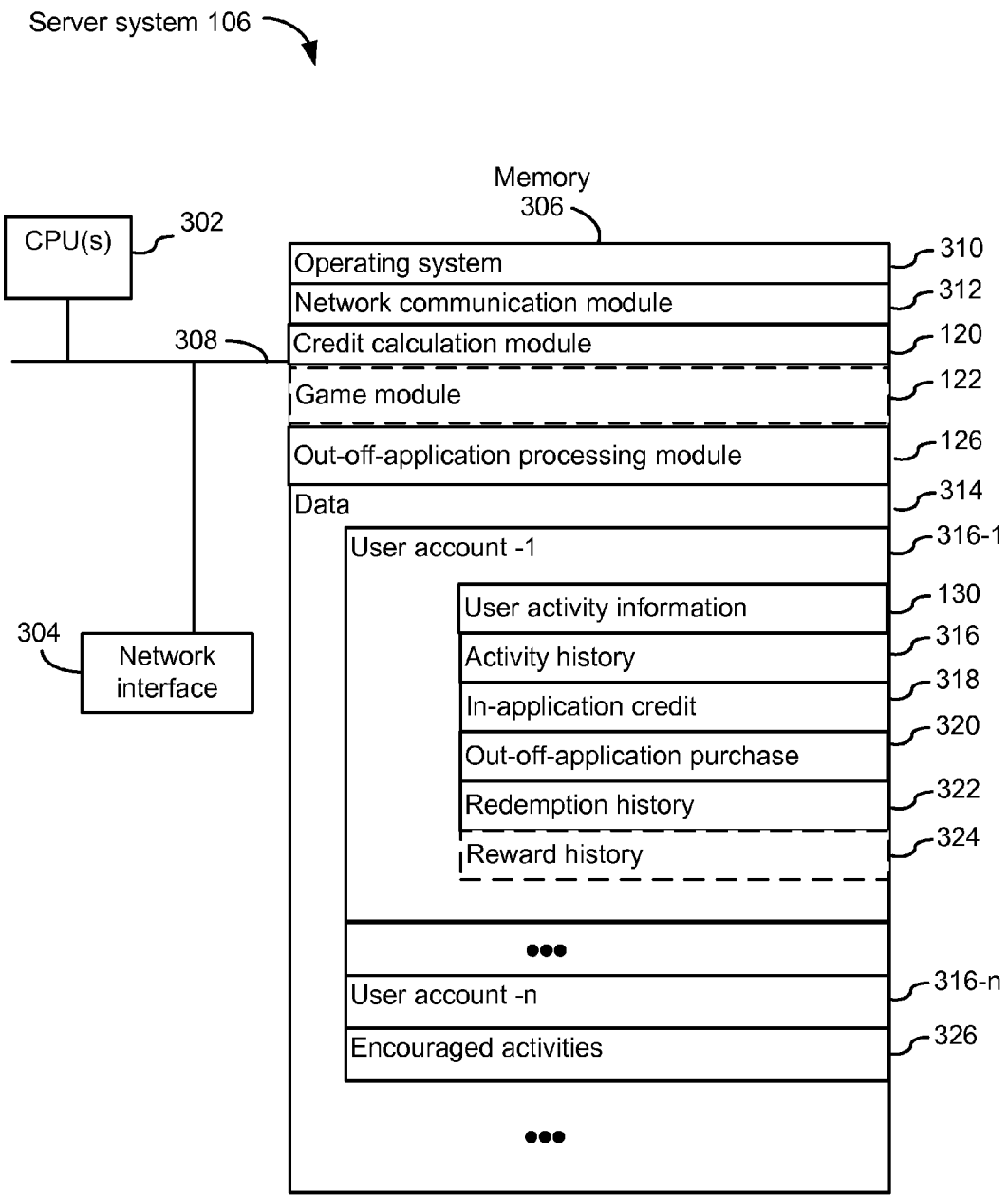
FIG. 3 is a block diagram illustrating a server system, in accordance with some implementations.

FIG. 3 is a block diagram illustrating the server system 106 ("server 106," also called a server), in accordance with some implementations. The server 106 typically includes one or more processing units CPU(s) 302 (also herein referred to as processors), one or more network interfaces 304, memory 306, and one or more communication buses 308 for interconnecting these components. The communication buses 308 optionally include circuitry (sometimes called a chipset) that interconnects and controls communications between system components. The memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 306 optionally includes one or more storage devices remotely located from CPU(s) 302. The memory 306, or alternatively the non-volatile memory device(s) within the memory 306, comprises a non-transitory computer readable storage medium. In some implementations, the memory 306 or alternatively the non-transitory computer readable storage medium stores the following programs, modules and data structures, or a subset thereof:

- an operating system 310, which includes procedures for handling various basic system services and for performing hardware dependent tasks;
- a network communication module (or instructions) 312 for connecting the server 106 with other devices (e.g., one or more electronic devices 102) via the one or more network interfaces 304 (wired or wireless), or the communication network 104 (FIG. 1);
- a credit calculation module 114 for calculating an amount of credit, in accordance with a user's activity level;
- a game module 122 for applying credits calculated into one or more games associated with a user, as well as maintaining gaming records for the user;
- an out-of-application processing module 126 applies credits calculated for a user to out-of-game purchases (e.g., generating a coupon or a gift card for purchasing a STARBUCKS coffee at a local supermarket); and
- data 314 stored on the server 106, which include:
  - one or more user accounts 316-n, which include:
    - user activity information 130 for indicating an activity level for a user (e.g., how many miles the user has run in the past hour, or how many calories the user has burned this week);
    - activity history 316 for indicating one or more activities (e.g., jogging, running, swimming, and standing still) a user has engaged or involved in during a history or present time period (e.g., two days ago or now);
    - an in-application credit 318 for representing an amount of credit a user currently carries for one or more applications;
    - an out-of-application purchase 320 for representing an out-of-application purchase a user has made within a predefined time period;
    - a redemption history 322 for representing a history how a user has redeemed his/her credits, and manners thereof; and
    - a reward history 324 for representing a history of incentives, discounts, promotions, or rewards that have been offered to a user, and subsequent outcome thereof (e.g., whether a user has declined or accept a reward, and how fast a user redeem a coupon provided, indicative of the user's preferences both in application and out of the application); and
  - one or more encouraged (e.g., preferred) user activities (e.g., identified by a content provider), such as: a low carbon emission activity (e.g., jogging as opposed to boating), a green energy activity (hay-riding as opposed to driving a motor vehicle), a low energy consumption activity (e.g., floating in a float tank), a health promotion activity (e.g., teeth-brushing for a medically-sound number of times per day), a low-risk activity (e.g., jogging as opposed to rock climbing), or a low-danger activity (e.g., jogging in a community park as opposed to jogging in a desert).

In some implementations, one or more of the above identified elements are stored in one or more of the previously mentioned memory devices and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 306 optionally stores a subset of the modules and data structures identified above. Furthermore, the memory 306 optionally stores additional modules and data structures not described above.

Although FIG. 3 shows a "server system 106," also referred to as a server, FIG. 3 is intended more as functional description of the various features which may be present in server system than as a structural schematic of the implementations described herein. In practice, and as recognized by those of ordinary skill in the art, items shown separately could be combined and some items could be separated.

Figure 4A:
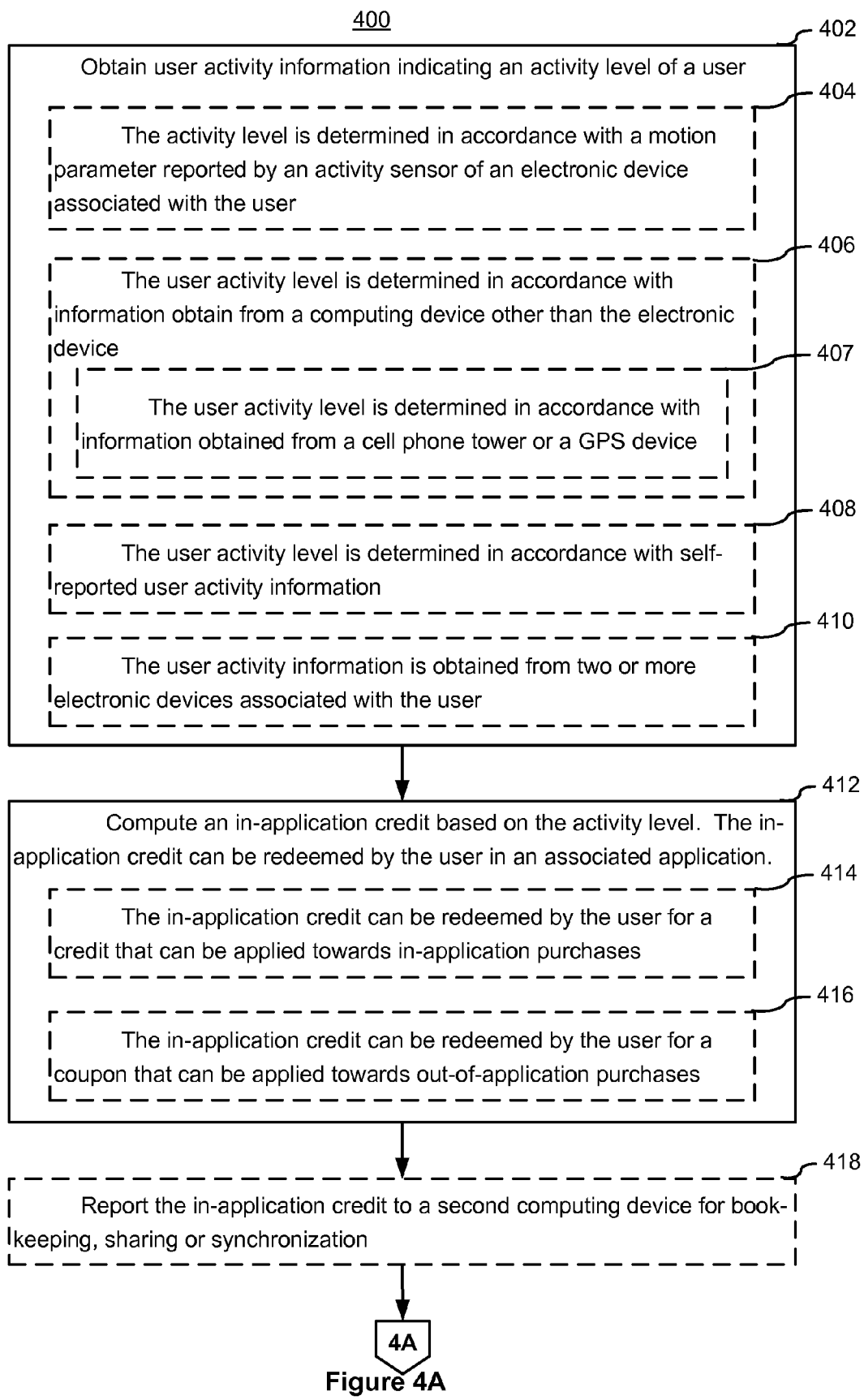
FIG. 4A-4B are flow charts illustrating a method for redeeming user activity level for virtual currency in a computer system, in accordance with some implementations.
Figure 4B:
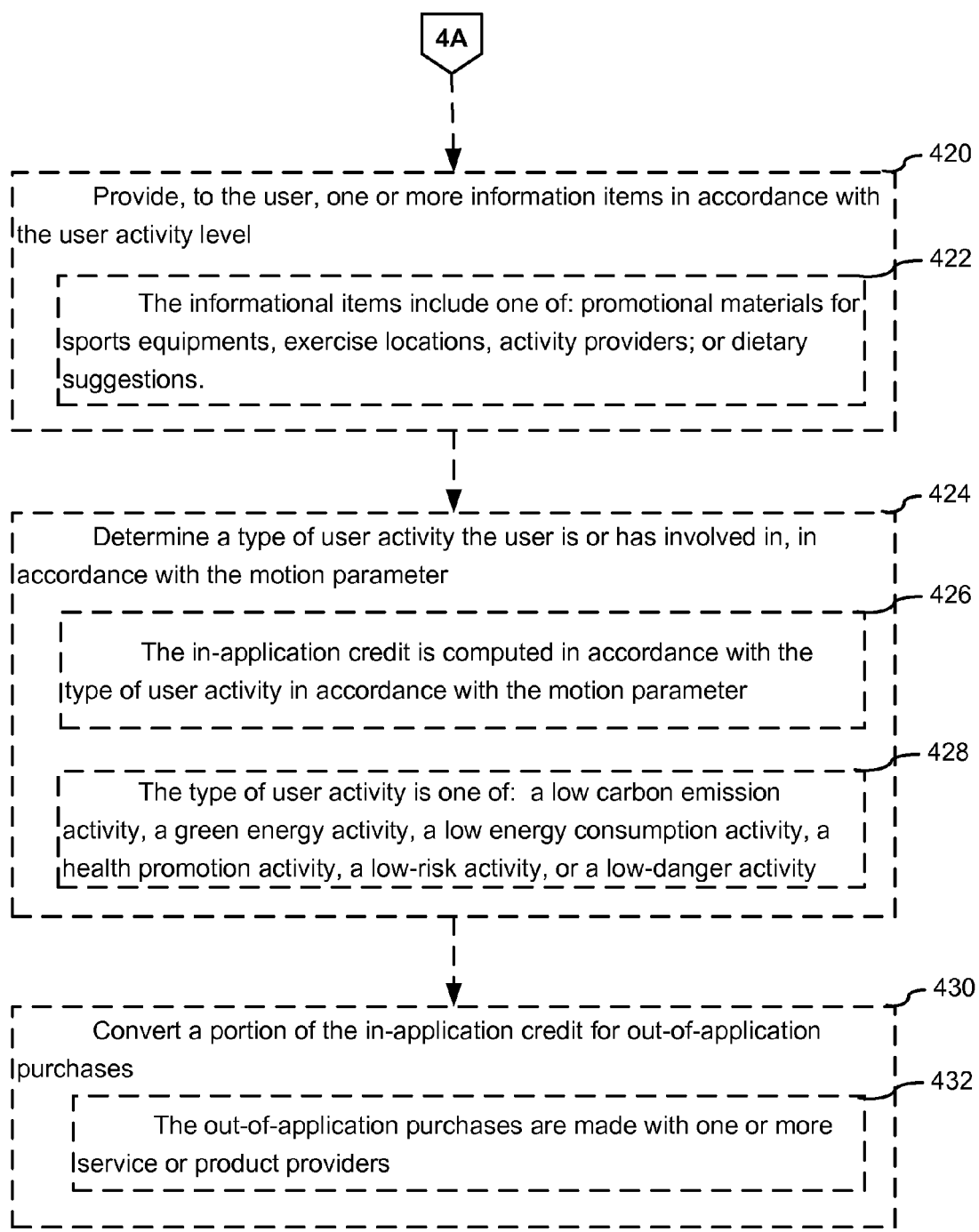

FIG. 4A-4B are flow charts illustrating a method 400, e.g., implemented at a system 100, at a server 106, at an electronic device 102, or a combination thereof, for redeeming user activity level for virtual currency in a computer system, in accordance with some implementations.

In some implementations, a server first obtains (402) user activity information indicating an activity level of a user (e.g., how active the user is). In some implementations, the user activity information is obtained from an electronic device distinct from the server.

In some implementations, the activity level is determined in accordance with a motion parameter (e.g., motion data) reported by an activity sensor of an electronic device associated with the user (404).

For example, how active (or inactive) a user has been for a specific day, is determined by or calculated using readings from one or more activity sensors (e.g., a pedometer, an accelerometer, a tilt sensor, an altitude sensor, a pressure sensor, and a combination of one or more of these sensors) embedded in a portable device which the user has carried with himself for the most part of the specific day. In some implementations, the portable device includes one or more sensors embedded in a smartphone, in a bracelet, in a belt, in a shoe insole, in a pair of glasses, in a watch, in a ring, in a head band, or in a piece of jewelry (a necklace or an earning).

In some implementations, the activity level is determined using readings from two or more activity sensors (406), e.g., to produce a more accurate determination. For example, when a user is hiking the Mr. Whitney in the Sierra Mountains, readings from an altitude sensor in conjunction with those from a pedometer can produce a more accurate determination of how active the user is then using reading from the pedometer alone.

In some implementations, the user activity level is determined in accordance with information obtained (e.g., imported) from a computing device other than the electronic device. For example, in some cases, the user activity level is determined using information gathered from a treadmill or a piece of gymnastic equipment, on which the user has been exercising for a predefined amount of time. In some implementations, the user activity level is determined in accordance with information obtained from a cell phone tower or a GPS device (407), e.g., using cell tower triangulation techniques. For example, a first cell phone tower triangulation indicates that a user was at 300 Laurie Meadows Dr, San Mateo, Calif. 94403 at 9:20 AM, Day 1; and a second cell phone tower triangulation indicates that the user was at 850 Davit Ln., Redwood City, Calif. 94065 at 9:35 AM, Day 1 (e.g., 15 minutes later). Based on these two triangulation results, it may be determined that the user ran over a distance of 2.5 miles over a 15 minutes time period, and user activity level may be subsequently determined based on these data.

In some implementations, the user activity information is obtained from two or more electronic devices associated with the user (410). For example, user activity information is a collected from a NINTENDO WII controller, a fitness monitoring band, a sports watch, and a pair of glasses or swimming goggles, a subset thereof, or one or more sensors embedded therein.

These approaches are advantageous as user may not carry the same electronic device at all times (e.g., it may be inconvenient for the user to swim with a smartphone that has a sensor), and thus user activity information compiled from a number of electronic devices (e.g., sources) having the ability to detect, measure, and record user activity can more accurately represent a user's overall activity level. Moreover, nowadays, a user is likely to carry a phone (e.g. a smartphone or a regular phone) at all time (except for swimming), and using cell tower triangulation techniques thus eliminates the need to carry an additional device (e.g., a bracelet).

In some implementations, the activity level is also determined in accordance with self-reported user activity information (408). For example, a user can, in some cases, self-report his or her own activity level (e.g., using a keyboard connected to the electronic device). In some implementations, the activity level is further determined in accordance with one or more predefined conversion criteria on the self-reported user activity information. In some case, self-report own activity information is subject to limitations, e.g., to protect system integrity. For example, a user may not self-report that he had run 10 miles over the past 2 minutes, or that he has swum 10 miles over the past hour, neither of which is physically impossible. In other case, to prevent potential obvious reporting errors, only 90% of the self-reported activity information is converted into or taken into account in determining an actual activity level, based on which (e.g., monetary) incentives are offered (e.g., offering CVS coupons to users who have jogged more than 3 miles during the past week).

In some implementations, after obtaining the user activity information, the server computes (412) an in-application credit based on the activity level. The in-application credit can be redeemed by the user in an associated application. In some implementations, the in-application credit can be redeemed by the user for a credit that can be applied towards in-application purchases (414). For example, based on how many miles a user has hiked or jogged during a weekend, a game provider determines that the user should receive a credit (having a value equivalent to $5), which can be redeemed in a first-person shooting game (e.g., a DOOM game or a HALF LIFE game) to purchase an equipment (e.g., an AK-47 machine gun) therein. For another example, based on how inactive a game player has been during a labor-day weekend, a game provider determines that the player's in-game credit should be reduced (e.g., penalized) (in an amount having a value equivalent to 50 US cents), e.g., so as to encourage the player to more frequently visit a local fitness center, with which the game provider has a business partnership. For still another example, based on how many push-ups a player has done in the past hour, a game provider issues a coupon to the player's in-game account, which may be applied towards purchasing specific equipment in the game.

These approaches are advantageous, because they not only offer a user additional incentives to exercise (e.g., jogging, hiking, and swimming); but also offer a content provider (e.g., a video game company) additional opportunity to maintain and expand its audience base. For example, a high school student who cannot afford to purchase credit for purchasing a body armor in a first person shooting game, may quickly loses interests, e.g., due to his inability to advance further in the game. If the student can, however, receive in-game credit for going to gym three times a week, or for walking (rather than driving) home after his day time classes, the student may likely remain a loyal user, and the game provider is likely to receiving revenue from the student when his financial situation improves (e.g., when he graduates and starts working).

In some implementations, the in-application credit can be redeemed by the user for a coupon that can be applied towards out-of-application purchases. In some case, a user's activity level and in-game credits gained in accordance therewith can be redeemed for a coupon for a purchase made outside the game. For example, having hiked for more than 3 hours in the Lake Tahoe area, a user receives an in-application credit equivalent to 10 dollars in an e-magazine/newspaper subscription application (e.g., similar to the AMAZON KINDLE application). If the user, however, prefers paper magazines over e-magazines (e.g., on a KINDLE device), e.g., because the user has medical conditions rendering it difficult to read on a computer display/monitor, the in-application credit can be applied to subscribe a magazine's traditional (e.g., paper) version. In some implementations, the in-application credit can be also redeemed for one of: a merchant credit, a discount voucher (e.g., a manufacturer coupon), a gift certificate (e.g., gift cards), or a promotional credit (e.g., weekend promotion discount).

In some implementations, the server additionally provides (420), to the user, one or more information items (e.g., advertising materials for exercising facilities or equipments) in accordance with the user activity level. In some implementations, the one or more informational items include one of: promotional materials for sports equipments, exercise locations, activity providers; or dietary suggestions. For example, having analyzed a user's exercise patterns and preferences, using the user's activity information and activity level accumulated over the past month, the server determines or predicts with a predefined level of certainty that the user is a vivid tennis player, but does not otherwise enjoy hiking. In accordance with these determinations, the server sends to the user, via e-mail or regular mail (through a USPS, FEDEX or UPS delivery), promotion brochures as well as location information of a nearby swimming facility.

In some implementations, in response to a user request, the server converts (430) a portion of the in-application credit for out-of-application purchases. For example, when a user indicates that he would like to close his gaming account, the server can convert credits the user has earned in a video shooting game into credits (e.g., in the form of a GROUPON voucher) at a local gun shop or shooting range.

In some implementations, the out-of-application purchases are made with one or more service or product providers. For example the out-of-applications purchase are made with trust service or provider, e.g., a local car repair technician who has at least a "more than satisfied" rating on YELP.com, or an out-of-state electrical equipment company who has been verified by subscribers to the ANGIE'S LIST website.

In some implementations, the one or more service or product providers are selected based on one or more selection criteria, e.g., whether a service provider is within 20 miles of a user's residence (ease of access) and whether a product can be delivered in time (before a user's birthday).

In some implementations, the server also determines (424) a type of user activity the user is or has involved in, in accordance with the motion parameter. For example the server, using data collected by an activity sensor, can determine whether a user has hiked, jogged, swum, played tennis/badminton/table tennis, or a combination of one or more activities (e.g., jogging in a morning and running in a late afternoon).

In some implementations, the in-application credit is computed in accordance with the type of user activity in accordance with the motion parameter, e.g., to encourage certain user behaviors. For example, to encourage a user to visit a local swimming facility, the server gives more credit when the user swims for half hour than when the user jogs for more than 3 hours, even though the latter may involve more physical exercise.

In some implementations, the type of user activity is one of: a low carbon emission activity (e.g., jogging as opposed to boating), a green energy activity (hay-riding as opposed to driving), a low energy consumption activity (e.g., floating in a float tank), a health promotion activity (e.g., teeth-brushing for a medically-sound number of times per day), a low-risk activity (e.g., jogging as opposed to rock climbing), or a low-danger activity (e.g., jogging in a community park as opposed to jogging in a desert).

In some implementations, the motion parameter includes information indicating a manner of activity or movement the user is involved in. In some implementations, the manner of the activity or the movement the user is involved in includes one of: (i) a type of activity or movement the user is involved in (e.g., playing tennis or swimming); (ii) a speed associated with the activity or the movement (e.g., how fast a user is swimming or has swum); (ii) an acceleration associated with the activity or the movement (e.g., did a user sprint or slowly run across a finish line in a running competition); (iv) a direction (e.g., is a user walking toward the east or west side) or orientation (e.g., an degree of angle to the sun or to a building) associated with the activity or the movement; and (v) a type of environment in which the activity or the movement takes place (e.g., using a pressure sensor to detect whether a user is in a swimming pool or using an altitude sensor and a GPS device to determine whether the user is in a mountain area).

In some implementations, the associated application is configured for execution on the electronic device. For example, the associated application is an application resident on the electronic device (e.g., a local application). For another example, the associated application can fully execute without a network connection with or data from a server (e.g., a self-contained application). These approaches enable the application to be at least partially executable when a network connection with a server is not available, e.g., when a user carrying a cell phone that has a movement sensor is hiking in a desolated area in the Death Valley National Park, where the cell phone cannot connect to any cellar network or the Internet. In these cases, user activity information can be save in a cache (e.g., a persistent storage, such as a hard drive, or a non-persistent storage, such as a RAM), and when a connection with the server becomes available (e.g., when the user comes home from her trip to a desert).

In some implementations, the user is represented by an avatar in the associated application, and at least one characteristic associated with the avatar corresponds to a historical activity level of the user. For example, if a user exercises more often, his or her avatar in a FARMVILLE game will receive more credit for purchasing advanced farming equipments. In some implementations, the associated application is a gaming application, such as a FARMVILLE game, and a CLASH OF CLANS game.

In some implementations, the motion parameter includes information indicating a manner of the user's finger movement in relation to the electronic device. For example, when the electric device is a smartphone, whether a user is finger-swiping or tapping on a touchscreen of the smartphone, how fast a finger swipe gesture is, and to what direction a finger swipe goes.

In some implementations, the server also reports the in-application credit to a second computing device (e.g., a dedicated data server) for book-keeping, sharing (with her FACEBOOK friends) or synchronization, e.g., to provide added data security.

Figure 5A:
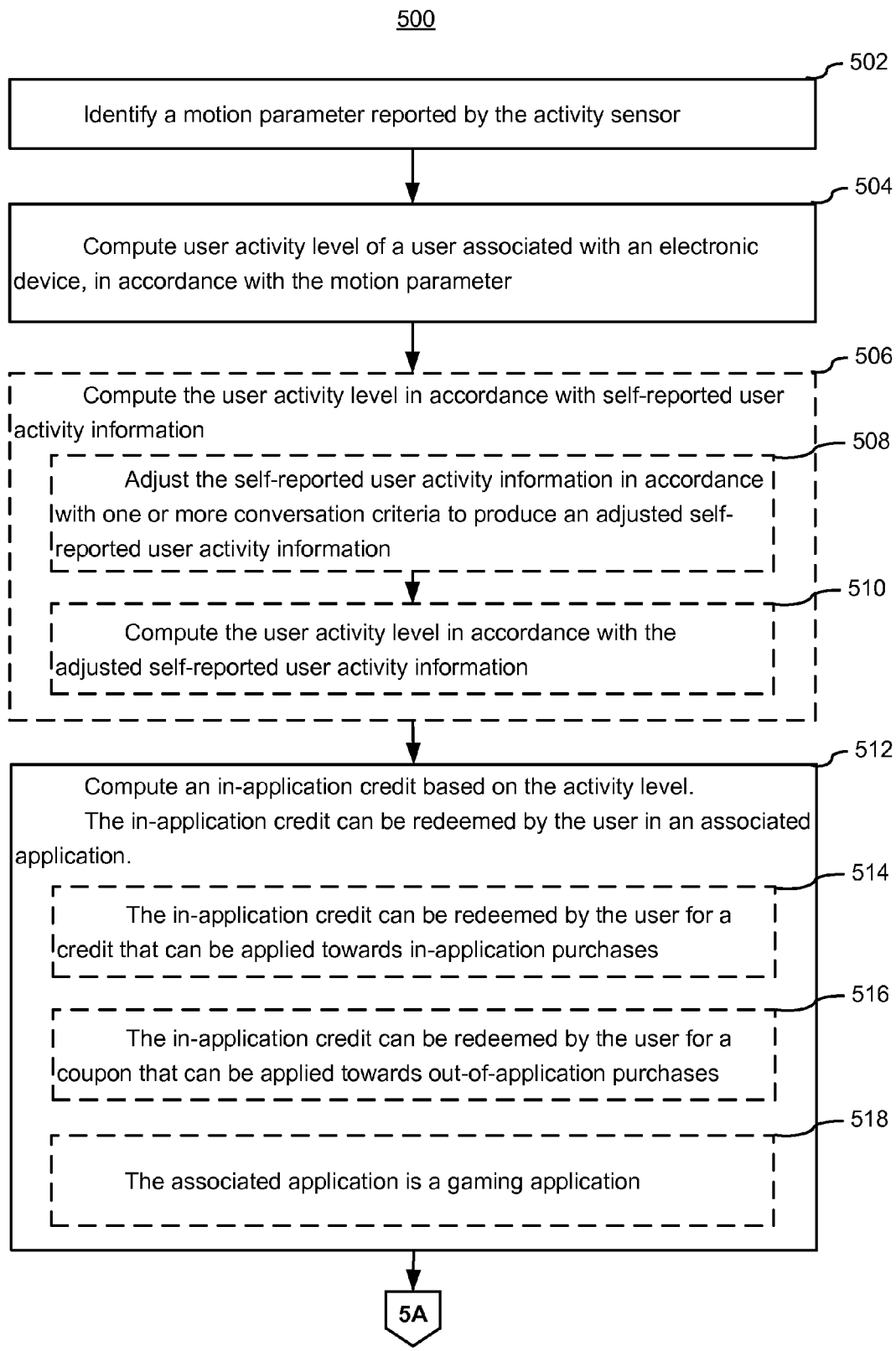
FIGS. 5A-5B are flow charts illustrating methods for redeeming user activity level for virtual currency, in accordance with some implementations.
Figure 5B:
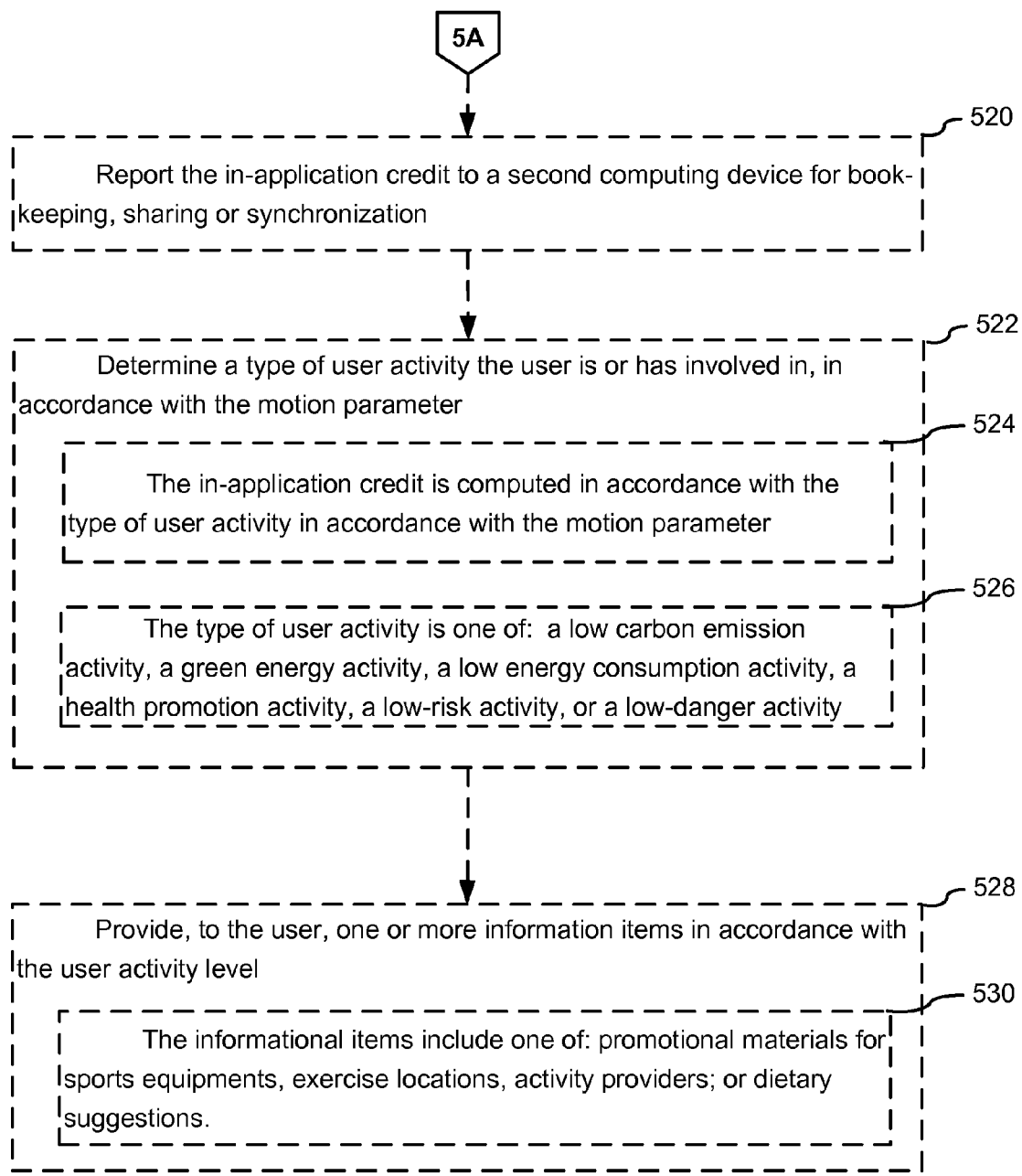

FIGS. 5A-5B are flow charts illustrating a method, e.g., implemented at an electronic device (including an activity sensor), for redeeming user activity level for virtual currency, in accordance with some implementations.

In some implementations, the client device first identifies (502) a motion parameter reported by the activity sensor. For example, a sensor embedded in a watch worn by a user can collect information on whether the user is running, at what speed, with what acceleration or deceleration, and to what direction.

In some implementations, the client device computes (504) the activity level of a user associated with the electronic device, in accordance with the motion parameter. For example, how active (or inactive) a user has been for a specific day, is determined by or calculated using readings from one or more activity sensors (e.g., a pedometer, an accelerometer, a tilt sensor, an altitude sensor, a pressure sensor, and a combination of one or more of these sensors) embedded in a portable device which the user has carried with himself for the most part of the specific day. In some implementations, the portable device includes one or more sensors embedded in a smartphone, in a bracelet, in a belt, in a shoe insole, in a pair of glasses, in a watch, in a ring, in a head band, or in a piece of jewelry (necklace or earrings).

In some implementations, the client device optionally computes the user activity level in accordance with self-reported user activity information (506). In some implementations, the client device adjusts (508) the self-reported user activity information in accordance with one or more conversation criteria to produce adjusted self-reported user activity information. In some implementations, the user activity level is computed in accordance with the adjusted self-reported user activity information (510). In some case, self-report own activity information is subject to limitations, e.g., to protect system integrity. For example, a user may not self-report that he had run 10 miles over the past 2 minutes, or that he has swum 10 miles over the past hour, neither of which is physically possible. In other case, to prevent potential fraud, only 90% of the self-reported activity information is converted into or taken into account in determining an actual activity level, based on which (e.g., monetary) incentives are offered (e.g., offering CVS coupons to users who have jogged more than 3 miles during the past week).

In some implementations, the client device computes (512) an in-application credit based on the activity level, wherein the in-application credit can be redeemed by the user in an associated application. In some implementations, the in-application credit can be redeemed by the user for a credit that can be applied towards in-application purchases. For example, based on how many miles a user has hiked or jogged during a weekend, a game provider determines that the user should receive a credit (having a value equivalent to $5), which can be redeemed in a first-person shooting game (e.g., a DOOM game or a HALF LIFE game) to purchase an equipment (e.g., an AK-47 machine gun) therein. For another example, based on how inactive a game player has been during a labor-day weekend, a game provider determines that the player's in-game credit should be reduced (e.g., penalized) (in an amount having a value equivalent to 50 US cents), e.g., so as to encourage the player to more frequently visit a local fitness center, with which the game provider has a business partnership. For still another example, based on how many push-ups a player has done in the past hour, a game provider issues a coupon to the player's in-game account, which may be applied towards purchasing specific equipment in the game.

These approaches are advantageous, because they not only offer a user additional incentives to exercise (e.g., jogging, hiking, and swimming); but also offer a content provider (e.g., a video game company) additional opportunity to maintain and expand its audience based. For example, a high school student who cannot afford to purchase credit in a first person shooting game to purchase a body armor for use in the game, may quickly loses interests, e.g., due to his inability to advance further in the game. If the student can, however, receive in-game credit for going to gym three times a week, or for walking (rather) driving home after his day time classes, the student may likely remain a loyal audience, and the game provider is likely to receiving revenue from the student when his financial situation improves (e.g., when he graduates and starts working as a IT technician at an prestigious international law firm).

In some implementations, the in-application credit can be redeemed by the user for a credit that can be applied towards in-application purchases (514).

In some implementations, the in-application credit can be redeemed by the user for a coupon that can be applied towards out-of-application purchases in some case, a user's activity level and in-game credits gained in accordance therewith can be redeemed for a coupon for a purchase made outside the game. For example, having hiked for more than 3 hours in the Lake Tahoe area, a user receives an in-application credit equivalent to 10 dollars in an e-magazine/newspaper subscription application (e.g., similar to the AMAZON KINDLE application). If the user, however, prefers paper magazines over e-magazines (e.g., magazines read on a KINDLE device), e.g., because the user has medical conditions rendering it difficult to read on a computer display/monitor, the in-application credit can be applied to subscribe a magazine's traditional (e.g., paper) version. In some implementations, the in-application credit can be also redeemed for one of: a merchant credit, a discount voucher (e.g., a manufacturer coupon), a gift certificate (e.g., gift cards), or a promotional credit (e.g., weekend promotion discount).

In some implementations, the in-application credit can be redeemed by the user for a coupon that can be applied towards out-of-application purchases (516). In some implementations, in response to a user request, a portion of the in-application credit is converted, by the electronic device rather than a server (e.g., when the application is a self-contained local application), for out-of-application purchases. For example, when a user indicates that he would like to close his gaming account, credits the user has earned in a video shooting game are converted into credits (e.g., in the form of a GROUPON voucher) at a local gun shop or shooting range.

In some implementations, the electronic device also provides (528), to the user, one or more information items (e.g. advertising material or exercise recommendations) in accordance with the user activity level. In some implementations, the one or more informational items include one of: promotional materials for sports equipments, exercise locations, activity providers; or dietary suggestions. For example, having analyzed a user's exercise patterns and preferences, using the user's activity information and activity level accumulated over the past month, the electronic device determines or predicts with a predefined level of certainty that the user is a vivid tennis player, but does not otherwise enjoy hiking. In accordance with these determinations, the electronic device sends to the user, via e-mail or regular mail (through a USPS, FEDEX or UPS delivery), promotion brochures as well as location information of a nearby swimming facility.

In some implementations, the out-of-application purchases are made with one or more service or product providers. For example the out-of-applications purchase are made with trust service or provider, e.g., a local car repair technician who has at least a "more than satisfied" rating on YELP.com, or an out-of-state electrical equipment company who has been verified by subscribers to the ANGIE'S LIST website.

In some implementations, the one or more service or product providers are selected based on one or more selection criteria, e.g., whether a service provider is within 20 miles of a user's residence (ease of access) and whether a product can be delivered in time (before a user's birthday).

In some implementations, the client device determines (522) a type of user activity the user is or has involved in, in accordance with the motion parameter.

In some implementations, the client device computes (524) the in-application credit in accordance with the type of user activity in accordance with the motion parameter, e.g., to encourage certain user behaviors. For example, to encourage a user to visit a local swimming facility, the electronic device gives more credits when the user swims for half hour than when the user jogs for more than 3 hours, even though the latter may involve more physical exercise. In some implementations, the type of user activity is one of: a low carbon emission activity (e.g., jogging as opposed to boating), a green energy activity (hay-riding as opposed to driving), a low energy consumption activity (e.g., floating in a float tank), a health promotion activity (e.g., teeth-brushing for a medically-sound number of times per day), a low-risk activity (e.g., jogging as opposed to rock climbing), or a low-danger activity (e.g., jogging in a community park as opposed to jogging in a desert) (526).

In some implementations, the electronic device also determines a type of user activity the user is or has been involved in, in accordance with the motion parameter. For example the electronic device, using data collected by an activity sensor, determines whether a user has hiked, jogged, swum, played tennis/badminton/table tennis, or a combination of one or more activities (e.g., jogging in a morning and running in a late afternoon).

In some implementations, the motion parameter includes information indicating a manner of activity or movement the user is involved in. In some implementations, the manner of the activity or the movement the user is involved in includes one of: (i) a type of activity or movement the user is involved in (e.g., playing tennis or swimming); (ii) a speed associated with the activity or the movement (e.g., how fast a user is swimming or has swum); (ii) an acceleration associated with the activity or the movement (e.g., did a user sprint or slowly run across a finish line in a running competition); (iv) a direction (e.g., is a user walking toward the east or west side) or orientation (e.g., an degree of angle to the sun or to a building) associated with the activity or the movement; and (v) a type of environment in which the activity or the movement takes place (e.g., using a pressure sensor to detect whether a user is in a swimming pool or using an altitude sensor and GPS device to determine whether the user is in a mountain area). In some implementations, determination of a type of user activity can also be used to promote environmentally beneficial behavior. For example, in-game credits can be awarded to users who take public transit (e.g., a bus or train) or walk or bike to work. Each of these different modes of transportation can be determined by an application using some combination of information from activity and environmental sensors as well as the time of day.

In some implementations, the associated application is configured for execution on the electronic device. For example, the associated application is an application resident on the electronic device (e.g., a local application). For another example, the associated application can fully execute without a network connection and with or without data from a server (e.g., a self-contained application). These approaches enable the application to at least partially be executable when a network connection with a server is not available, e.g., when a user carrying a cell phone that has a movement sensor is hiking in a desolated area in the Death Valley National Park, where the cell phone cannot connect to any cellar network or the Internet. In some implementations, applications configured for offline use can cache the collected activity and environmental information for later evaluation.

In some implementations, the user is represented by an avatar in the associated application, and at least one characteristic associated with the avatar corresponds to a historical activity level of the user. For example, if a user exercises more often or e.g., to encourage certain behavior, swims for one hour as opposed to run for 10 minutes, his or her avatar in a FARMVILLE game will receive more credits for purchasing advanced farming equipments. In some implementations, the associated application is a gaming application, such as a FARMVILLE game, and a CLASH OF CLANS game.

In some implementations, the motion parameter includes information indicating a manner of the user's finger movement in relation to the electronic device. For example, when the electric device includes a touchscreen, a touchpad or a track pad, whether a user is finger-swiping or tapping on the touchcreen, how fast a finger swipe gesture is, and to what direction a finger swipe goes.

In some implementations, the electronic device further reports (520) the in-application credit to a second computing device (e.g., a dedicated data server) for book-keeping, sharing (with her FACEBOOK friends) or synchronization, e.g., to provide added data security.

In some implementations, the associated application is a gaming application, such as a FARMVILLE game, and a CLASH OF CLANS game.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first application could be termed a second application, and, similarly, a second application could be termed a first application, which changing the meaning of the description, so long as all occurrences of the "first application" are renamed consistently and all occurrences of the "second application" are renamed consistently. The first application, and the second application are both applications, but they are not the same application.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method comprising:
at a computer system having one or more processors and memory storing one or more programs for execution by the one or more processors:
obtaining user activity information, wherein the user activity information at least includes a motion parameter reporter by an activity sensor of an electronic device associated with the user;
determining a user activity level of the user according to the user activity information;
determining one or more user activity types in which the user is or has been involved in accordance with the user activity information including the motion parameter, wherein the motion parameter includes information indicating a manner of activity or movement the user is involved in, and the manner of the activity or the movement the user is involved in includes one or more of: an acceleration associated with the activity or the movement a direction or orientation associated wit the activity or the movement, or a type of environment in which the activity or the movement takes place; and
computing an in-application credit based at least in part on the determined user activity level and the determined one or more user activity types, wherein the in-application credit can be redeemed by the user in an associated application.

2. The method of claim 1, wherein the user activity level is determined in accordance with one or more of: a motion parameter reported by an activity sensor of an electronic device associated with the user, information obtained from a computing device other than the electronic device, information obtained from a cell phone tower or a GPS device, and self-reported user activity information.

3. The method of claim 2, wherein the user activity level is further determined in accordance with one or more predefined conversion criteria on the self-reported user activity information.

4. The method of claim 1, wherein the user activity information is obtained from two or more electronic devices associated with the user.

5. The method of claim 1, wherein the in-application credit can be redeemed by the user for a credit that can be applied towards in-application purchases.

6. The method of claim 1, wherein the in-application credit can be redeemed by the user for a coupon that can be applied towards out-of-application purchases.

7. The method of claim 1, wherein the in-application credit can be redeemed for one of: a merchant credit, a discount voucher, a gift certificate, or a promotional credit.

8. The method of claim 1, further comprising:
providing, to the user, one or more information items in accordance with the user activity level.

9. The method of claim 8, wherein the one or more information items include one of: promotional materials for sports equipments, exercise locations, activity providers, or dietary suggestions.

10. The method of claim 1, further comprising converting a portion of the in-application credit for out-of-application purchases, wherein the out-of-application purchases are made with one or more service or product providers that are selected based on one or more selection criteria.

11. The method of claim 1 wherein a respective one of the one or more user activity types is one of: a low carbon emission activity, a green energy activity, a low energy consumption activity, a health promotion activity, a low-risk activity, or a low-danger activity.

12. The method of claim 1, wherein the associated application is configured for execution on an electronic device associated with the user.

13. The method of claim 1, wherein the user is represented by an avatar in the associated application, and at least one characteristic associated with the avatar corresponds to a historical activity level of the user.

14. The method of claim 1, wherein the motion parameter includes information indicating a manner of the user's finger movement in relation to an touch-sensitive surface of the electronic device associated with the user.

15. The method of claim 1, further comprising: reporting the in-application credit to a second computing device for book-keeping, sharing or synchronization.

16. A method comprising:
  at an electronic device having,
    an activity sensor,
    one or more processors and
    memory storing one or more programs for execution by the one or more processors:
      identifying a motion parameter reported by the activity sensor;
      computing a user activity level of a user of the electronic device based at least in part on the motion parameter;
      determining one or more user activity types that the user is or has been involved in based at least in part on the motion parameter, wherein the motion parameter includes information indicating a manner of activity or movement the user is involved in, and the manner of the activity or the movement the user is involved in includes one or more of: an acceleration associated with the activity or the movement, a direction or orientation associated wit the activity or the movement, or a type of environment in which the activity or the movement takes place; and
      computing an in-application credit based at least in part on the determined user activity level and the determined one or more activity types, wherein the in-application credit can be redeemed by the user in an associated application.

17. An electronic device, comprising:
  one or more processors;
  memory storing one or more programs to be executed by the one or more processors, the one or more programs comprising instructions for:
    obtaining user activity information, wherein the user activity information at least includes a motion parameter reported by an activity sensor of an electronic device associated with the user;
    determining a user activity level of the user according to the user activity information;
    determining one or more user activity types in which the user is or has been involved in accordance with the user activity information including the motion parameter, wherein the motion parameter includes information indicating a manner of activity or movement the user is involved in, and the manner of the activity or the movement the user is involved in includes one or more of: an acceleration associated with the activity or the movement, a direction or orientation associated with the activity or the movement, or a type of environment in which the activity or the movement takes places; and
    computing an in-application credit based at least in part on the determined user activity level an the determined one or more user activity types, wherein the in-application credit can be redeemed by the user in an associated application.

* * * * *

UNITED STATES PATENT AND TRADEMARK OFFICE
CERTIFICATE OF CORRECTION

PATENT NO. : 9,286,510 B2  
APPLICATION NO. : 14/210205  
DATED : March 15, 2016  
INVENTOR(S) : Soohoo Page 1 of 1

It is certified that error appears in the above-identified patent and that said Letters Patent is hereby corrected as shown below:

In the claims,

Claim 17, column 20, line 31, please delete "places: and" and insert --place: and--;

Claim 17, column 20, line 33, please delete "level an the" and insert --level and the--.

Signed and Sealed this
Thirty-first Day of May, 2016

Michelle K. Lee
*Director of the United States Patent and Trademark Office*